United States Patent

[11] 3,629,798

[72] Inventor Donald W. Rockwell
 Dallas, Tex.
[21] Appl. No. 823,011
[22] Filed May 8, 1969
[45] Patented Dec. 21, 1971
[73] Assignee Texas Instruments Incorporated
 Dallas, Tex.

[54] METHOD AND SYSTEM FOR REFRACTION SEISMIC EXPLORATION
 19 Claims, 7 Drawing Figs.
[52] U.S. Cl. .................................................. 340/15.5, 181/0.5
[51] Int. Cl. .................................................. G01v 1/00
[50] Field of Search ..................................... 181/.5, .5 XC; 340/15.5

[56] References Cited
 UNITED STATES PATENTS
 2,713,395 7/1955 Swift .......................... 181/.5 XC
 2,902,107 9/1959 Erath et al. ................. 340/15.5 X
 2,991,447 7/1961 Winterhalter ............... 340/15.5
 3,432,807 3/1969 Lindsey ....................... 340/15.5

Primary Examiner—Rodney D. Bennett, Jr.
Assistant Examiner—H. A. Birmiel
Attorneys—James O. Dixon, Andrew M. Hassell, Harold Levine, Melvin Sharp and Rene'E Grossman ABSTRACT: A first seismic disturbance is generated at a reference location and a first set of refraction signals from the seismic disturbance is detected at a plurality of receiver locations spaced a preselected distance from the reference location. A second seismic disturbance is generated at an incremental distance from the reference location, the incremental distance being small compared to the preselected distance. A second set of refraction signals from the second seismic disturbance is received at the receiver locations. The first and second sets of refraction signals are time-shifted relative to one another by a time interval dependent upon the incremental distance and particular refractor layer velocities. The time-shifted signals are then combined in order to enhance selected portions of the signals and to attenuate unwanted or interfering events and noise.

INVENTOR
DONALD W. ROCKWELL

INVENTOR
DONALD W. ROCKWELL

INVENTOR
DONALD W. ROCKWELL

METHOD AND SYSTEM FOR REFRACTION SEISMIC EXPLORATION

This invention relates to seismic exploration, and more particularly to seismic exploration involving processing of refraction signals which have traveled along generally the same subsurface minimum travel-time paths.

Seismic exploration methods may be generally divided into reflection and refraction techniques, depending upon whether or not the generated seismic waves undergo reflection at the bottommost extent of their travel. In reflection seismic exploration, a number of geophones or detectors are spaced several hundred feet from one another and at moderate distances from a seismic disturbance generator. The detectors receive reflections of the seismic disturbance from underlying reflection horizons. A number of different techniques, including record stacking and various digital filtering methods, have heretofore been developed for processing of the received reflections in order to enhance desired reflection events to facilitate obtaining meaningful seismic records.

In refraction seismic exploration, a number of seismic detectors are usually, but not necessarily, spaced at greater distances for one another than in reflection shooting, with the refraction detector array being spaced at great distances from the source of seismic disturbances, in practice as much as 25 to 50 miles. Thus, refraction seismic exploration enables large areas to be quickly surveyed, and also enables mapping of certain remote areas in which reflection shooting would be extremely difficult or costly. Further, in refraction exploration, refracted signals having relatively low-frequency spectrums, and therefor low attenuation, are of interest as compared to the higher frequency spectrums often of primary interest in reflection shooting. The use of refraction shooting is also desirable in mapping massive geologic members such as limestone layers or the like, as the velocity information provided by such refraction techniques assists in correlating and identifying desired events or key horizons.

Improved techniques have been developed for obtaining and interpreting refraction data, a number of which are described in *Seismic Refraction Prospecting*, published by The Society of Exploration Geophysicists in 1967. However, in spite of the many advantages which attach to refraction seismic exploration, the use of reflection techniques is currently more common. It is believed that one reason for this situation is that suitable techniques have not been heretofore developed for suppressing unwanted events and enhancing desired events in seismic refraction work.

In accordance with the present invention, detectors are provided for receiving refraction seismic signals generated from a first location and for subsequently receiving additional refraction seismic signals generated from a second location. The first and second refraction records are time-shifted in dependence upon the velocity of the subsurface layers and upon the distance between the first and second source locations, the time-shifted signals being combined to enhance selected specific refraction events.

In accordance with a more specific aspect of the invention, a first seismic disturbance is generated at a reference location. Refraction signals are detected and recorded at receiver locations spaced a preselected distance from the reference location. A second seismic disturbance is subsequently generated at an incremental distance from the reference location, the incremental distance being small compared to the preselected distance. A second recording of refraction signals emanating from the second disturbance is then made at the receiver locations, the two sets of refraction signals having traveled along generally the same subsurface paths. The first and second refraction records are time-shifted relative to one another by a time interval dependent upon the magnitude of the incremental distance and upon the refractor velocities involved. The time-shifted signals are combined in order to enhance a selected portion of the signals and to suppress undesirable events in the signals.

For a more complete understanding of the present invention and for further objects and advantages thereof, reference may now be had to the following description taken in conjunction with the accompanying drawings, in which.

Figure 4:
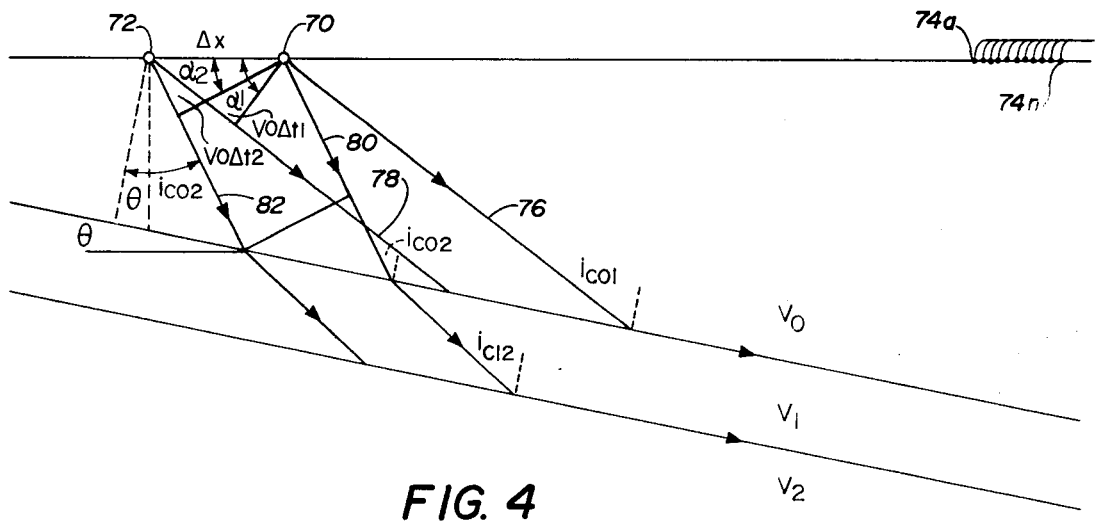
Figure 5:
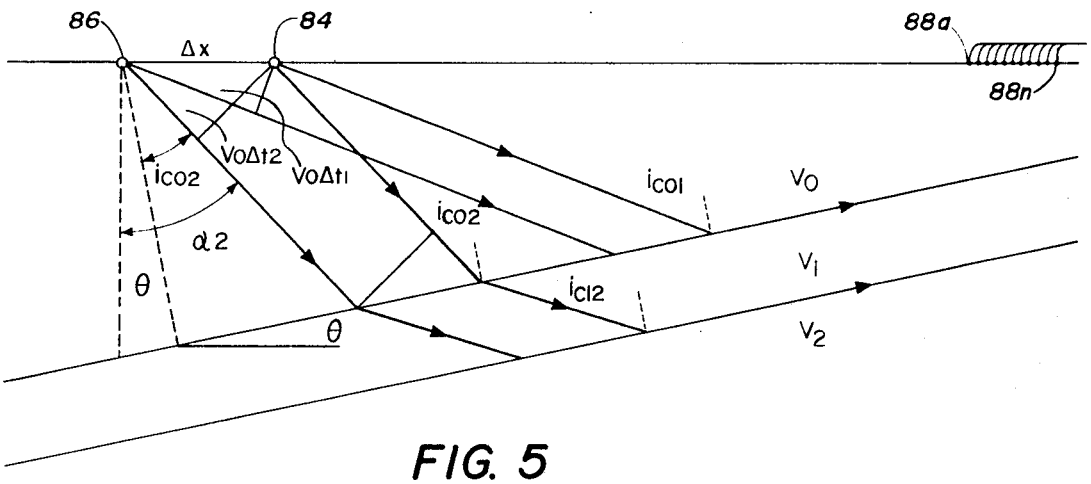
Figure 6:
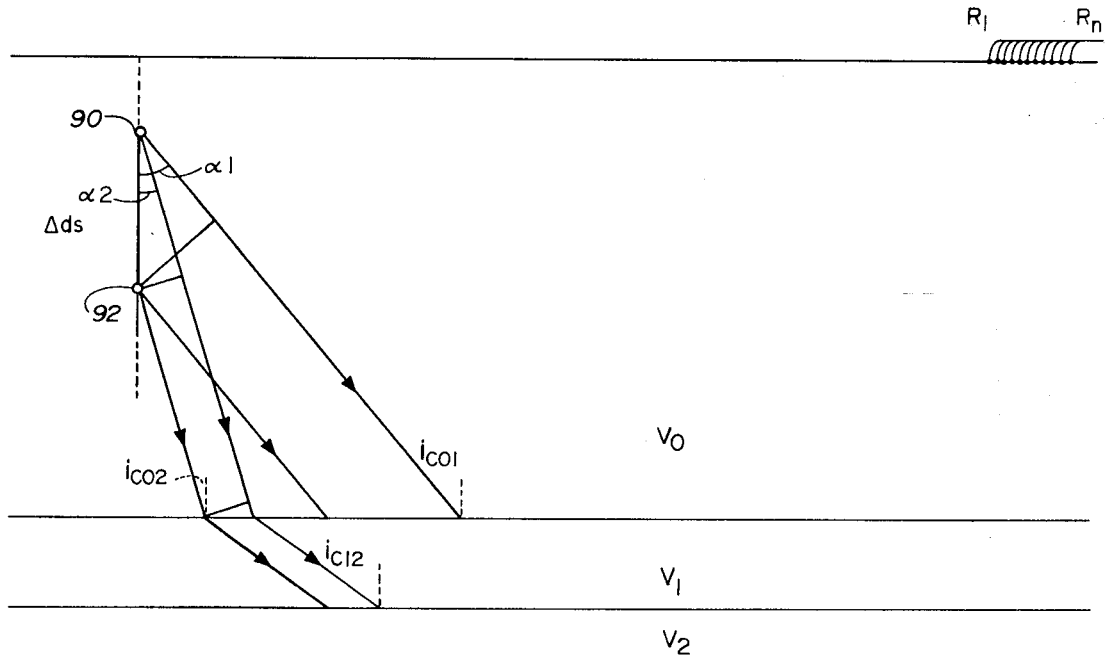
Figure 7:
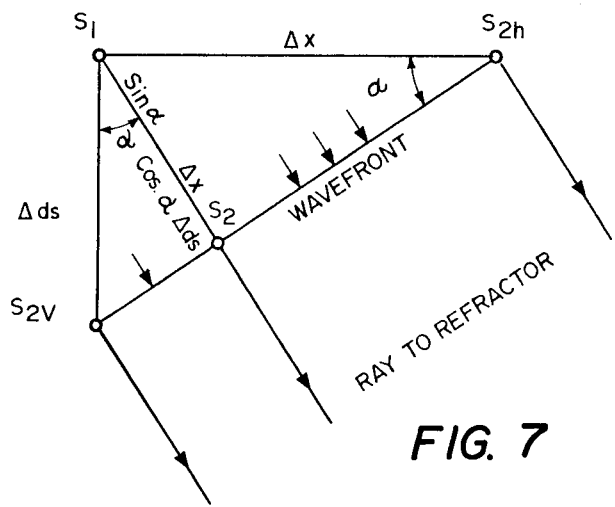

FIGS. 3a-d illustrate highly idealized refracted signals having time delays according to the invention;

FIGS. 4 and 5 are diagrammatic illustrations of the practice of the present invention with down-and-up dip underlying refracting horizons;

FIG. 6 is a diagrammatic illustration of refraction exploration utilizing vertical spacing of seismic disturbances; and FIG. 7 is a diagram illustrating the relationship of horizontal and vertical shot displacements according to the invention to achieve a given time change.

Figure 1:
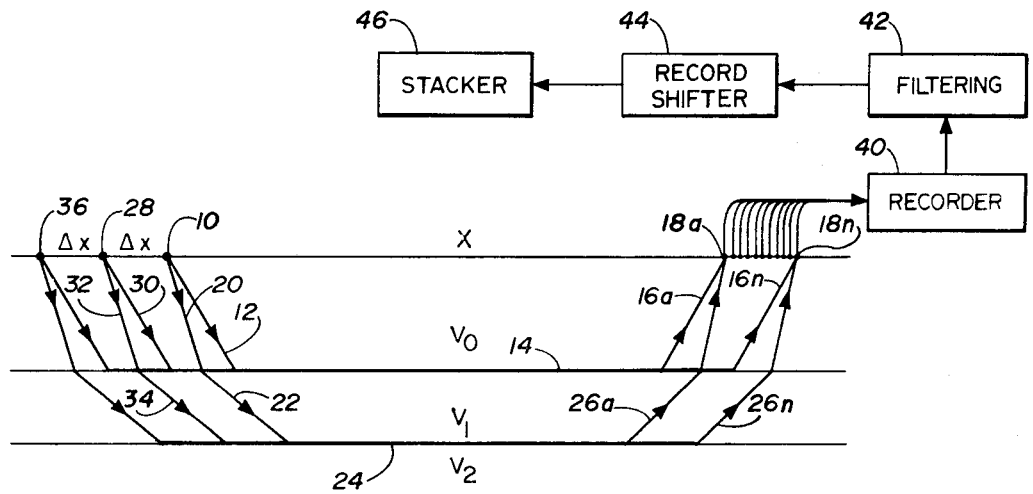
FIG. 1 is a diagrammatic illustration of a system for performing refraction exploration according to the invention.

Referring to FIG. 1, a refraction exploration system is illustrated which includes a first seismic wave generation location 10, such as a dynamite shot, which generates acoustic waves which penetrate underlying subsurface areas in the well-known manner. In this example, it will be assumed that the earth's subsurface comprises three generally horizontal layers having different velocity characteristics. The uppermost subsurface layer has a relatively low velocity characteristic $V_0$, the next underlying subsurface layer has a somewhat higher velocity characteristic $V_1$ and next underlying subsurface layer has the highest velocity characteristic $V_2$. By velocity characteristic, it is understood that what is meant is the velocity by which acoustic waves travel through, within, or along the particular subsurface layer.

In the well-known manner, the seismic wave 12 travels through the earth along a generally constant velocity path and is received by a plurality of seismic detectors 18a–n spaced from the location 10 by a distance X. The number of detectors 18a–n will be different for various desired operations, with a typical detector spread comprising 24 detectors. Seismic wave 12 travels the well-known minimum time ray path which extends for a majority of its length generally parallel to the surface of the earth along the path 14. The wave is then refracted upwardly along paths 16a–16n, only two of which are shown for simplicity of illustration, for reception by detectors 18a–n. Similarily, a seismic wave 20 penetrates the first subsurface area and is refracted through the second subsurface area along ray path 22. The seismic wave then travels along the minimum time ray path 24 until it is refracted along ray paths 26a–n for reception by the detectors 18a–n.

After the detonation of the seismic disturbance at the reference location 10, a second seismic disturbance is generated at location 28 by a suitable seismic source, such as dynamite shot or an air gun source. Location 28 is spaced an incremental distance $\Delta x$ from the initial location 10, the incremental distance being small compared to distance X. Seismic waves travel from location 28 along the ray path 30 and then generally along the minimum time ray path 14 and along ray paths 16a–n for reception by the seismic detectors 18a–n. Similarly, seismic waves travel along ray paths 32 and 34 and then along the minimum time ray path 24 and 26a–n for reception by the detectors 18a–n. It will thus be seen that the seismic disturbances generated at locations 10 and 28 travel similar ray paths, with the exception of the initial difference in ray paths caused by the separation of the locations by the incremental distance $\Delta x$.

A number of additional seismic disturbances are generated according to the invention, with only one additional shot location 36 being shown for simplicity of illustration. Location 36 is also spaced an incremental distance $\Delta x$ from the location 28. The seismic waves generated at location 36 again follow similar minimum time ray paths as the disturbances generated at locations 10 and 28.

The incremental distances $\Delta x$ are small compared to the distance X by which the seismic disturbance locations are separated from the detectors 18a–n. In a typical operation of the invention, $\Delta x$ may be varied from perhaps 300 feet up to several thousand feet, while the distance X may range up to as much as 50 miles in length. Criteria for predetermining $\Delta x$ will be subsequently described.

The electrical signals generated by the detectors 18a–n are recorded on a suitable recorder 40 in the manner well-known in the art. The signals received at a filtering station 42 are subsequently shifted in time relative to one another at station 44, as will be subsequently described. After time shifting, the records are combined, as by summing or stacking at station 46. In practice, the processing of the signals recorded by the recorder 40 will often be conducted at remotely located central processing stations. An example of a suitable digital-recording system for the invention is the Digital Field System manufactured and sold by Texas Instruments Incorporated of Dallas, Tex., and as described in U.S. Pat. No. 3,075,607, issued to Aitken et al. on Jan. 29, 1963. The processing (time shifting and summing) can be carried out in any of various types of digital or analog computers.

For a more detailed explanation of the geometry of refraction events, including applications of Snell's Law, reference is made to U.S. Pat. No. 3,284,765, issued Nov. 8, 1966, and to the previously identified Seismic Refraction Prospecting, an S.E.G. publication.

Figure 2:
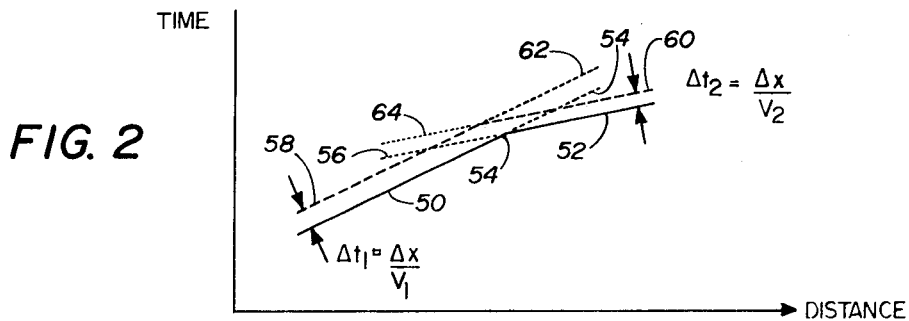
FIG. 2 is a graph of the travel time versus distance of refracted waves generated by the system shown in FIG. 1.

FIG. 2 illustrates a time-distance graph of the first arrivals received by the detectors 18a–n from the seismic disturbances generated at locations 10 and 28. This graph was prepared by determining the time intervals between such shot instant and the time of initial response of the various detectors 18a–n. These times are plotted as the ordinates of FIG. 2, while the distances from the reference or initial shot point, which is taken as the origin, to each of the detectors have been plotted as the abscissae.

Thus, points of the linear curve portion 50 represent the detection of seismic waves traveling along the ray paths 12, 14 and 16a–m, wherein m represents a particular detector within the middle section of detectors 18a–n. As the seismic waves which travel these paths travel through essentially uniform subsurface velocity fields, the resulting curve portion 50 is generally linear. Curve portion 52 represents the reception of seismic wave by detectors 18m–n which have traveled the seismic ray paths 20, 22, 24 and 26m–n. The slope of the curve portions 50 and 52 is different, due to the different velocity characteristics of the deepest subsurface horizontal interface along which the seismic waves traveled. The "knee" 54 of the curve portions denotes the time at which the seismic waves traveling through or along the lower subsurface layer begin to arrive at the detectors before the waves traveling along the shorter, but lower velocity, subsurface ray paths 12, 14, and 16a–n. Secondary or subsequent arrivals from the different subsurface segments at the detectors are plotted at dotted curve portions 54 and 56.

Curve portions 50 and 52 represent the first arrivals of seismic impulses emanating from the shot location 10. Curve portions 58 and 60 represent first arrivals of seismic waves generated at shot location 28. The generally linear curve portion 58 represents the first arrivals of seismic waves which have travelled generally along the ray paths 30, 14, and 16a–m. The generally linear curve portion 60 represents the first arrivals of seismic waves which have traveled through the longer, but higher velocity, ray paths 32, 34, 24, and 26m–n. Secondary arrivals of these same events are plotted on curve portions 62 and 64. It is important to note that curve portions 50–54 and 58–62 are generally parallel and separated only by a time interval designated at $\Delta_1$. Similarly, the curve portions 52–56 and 60–64 are parallel and separated only by a time interval designated as $\Delta t_2$.

It is well-known that the recorder moveout pattern of refracting events depends only upon the velocity along the refracting interface and of the overburden and on the attitude of the refractor under the recording spread. The refractor events plotted in FIG. 2 thus exhibit the same moveouts, or apparent velocities, even though the shot locations 10 and 28 are separated by a distance $\Delta x$. It is, of course, assumed in the present example that moving the shot location does not alter the common portion of the minimum time travel paths or the trajectories of the ray paths involved, such as by penetration to a deeper level or by introduction of a shorter or faster travel path.

Since the seismic waves corresponding to the first arrivals plotted as curve portions 50 and 58 travel generally similar minimum time travel paths, except for the incremental distance $\Delta x$, it may be seen that:

$$\Delta t_1 = \Delta x / V_1 \qquad (1)$$ wherein $V_1$ = the velocity of the seismic waves through the horizontal common portion of the minimum time travel path. Similarly, it may be seen that:

$$\Delta t_2 = \Delta x / V_2, \qquad (2)$$

wherein $V_2$ = the velocity along the horizontal segment of the common minimum time travel path. With the use of these relationships, the present invention contemplates time-shifting seismic traces by time increments dependent upon the magnitude of the incremental distance between shot locations and upon velocities, in order to selectively enhance or suppress selected portions of the seismic waves.

Figure 3:
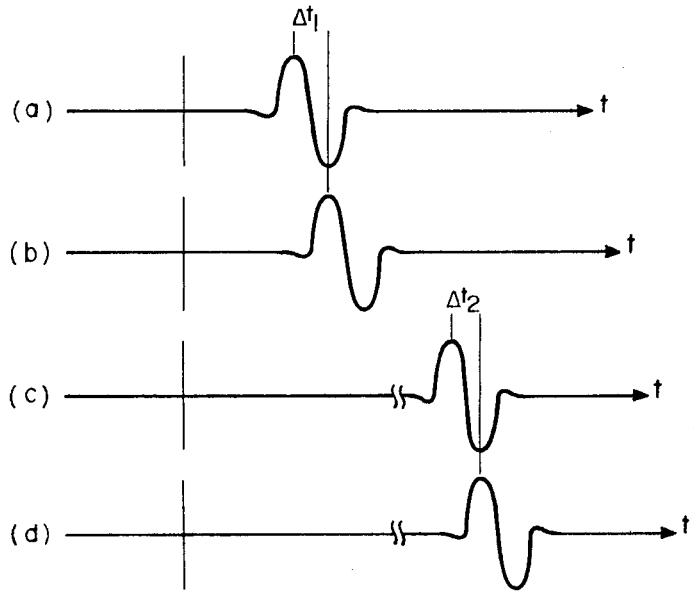

FIGS. 3a–d illustrate four wave traces, each having a discrete refraction event according due to reception of an arrival from a shot point. FIG. 3a illustrates an idealized arrival which travels through the minimum time path 14 (FIG. 1) from location 10 to detector 18a. FIG. 3b illustrates an arrival which travels the minimum time path 14 from location 28 to detector 18a. The two events in FIGS. 3a–b are thus separated by time interval $\Delta t$, as defined in equation (1). By shifting the two events relative to one another by a time interval equal to $\Delta t_1$, and then summing, mixing, or stacking the two events, the events will tend to add and thus be enhanced.

FIGS. 3c–d illustrate arrivals from shot locations 10 and 28, respectively, which have traveled the minimum time path 24 (FIG. 1) and have been received by the same detector. By shifting these two events by a time interval $\Delta t_2$ as defined by equation (2), these events may be enhanced by adding or the like.

However, $\Delta t_1$ is greater than $\Delta t_2$, as seen in FIG. 2, due to the difference in velocities of the two subsurface layers along which the waves travel. The events shown in FIGS. 3c–d will thus tend to cancel one another if they are shifted relative to one another by $\Delta t_1$ and then summed. Similarly, the events shown in FIGS. 3a–b will tend to be canceled if they are shifted relative to one another by $\Delta t_2$ and then summed. It will thus be seen that by time shifting all of the recorded arrivals for two consecutive shots by the same selected time interval and then summing or stacking the records, selected events which travel along subsurface paths with a certain velocity may be enhanced at the expense of other events which travel along subsurface refractor paths having different velocities.

In addition to the selected enhancement of portions of the seismic waves, random noise will be attenuated by the summing or stacking of the records. The attenuation of random noise will result from the summation equal to $\sqrt{n}$, wherein $n$ is the number of shots stacked.

It will be seen that some particular incremental distance $\Delta x$ between shot locations will produce an optimum enhancement of a specific desired event relative to a specific undesired event, upon suitable time shifting of the records. By suitable calculations, this particular $\Delta x$ may be precalculated without the requirement of physically time shifting records through repeated experiments. This particular $\Delta x$ may be calculated in the following fashion. Assuming horizontal subsurface beds, a spacing apart of shot locations by $\Delta x$ will produce a time shift for two records of $\pm \Delta t_1 = \Delta x / V_1$ from a subsurface refractor of velocity $V_1$. Similarly, the spacing of $\Delta x$ will result in a time shift of $\pm \Delta t_2 = \Delta x / V_2$ for waves traveling along a subsurface layer having a velocity $V_2$. These time intervals will both be either positive or negative, according to whether or not the second shot is displaced away from or towards the detector spread. The differences of the time intervals would thus be:

$$\Delta t = \Delta t_1 - \Delta t_2 = \frac{\Delta x}{V_1} - \frac{\Delta x}{V_2} = \Delta x \cdot \frac{V_2 - V_1}{V_1 \cdot V_2} \qquad (3)$$

If $V_1 < V_2$, then $\Delta t_1$ will always be greater than $\Delta t_2$ and the net time shift is positive for positive $\Delta x$ (away from the shot point), or negative for a negative $\Delta x$ (toward the shot point).

In order to obtain cancellation of a particular unwanted event occurring on seismic traces received from two shots, it may be assumed that the optimum shift for the two shots is roughly that which places the unwanted event about 180° out of phase with itself. Thus, $\Delta t = P/2$, where $P$ is the apparent dominant period of the unwanted or interfering event.

As an example, for two shots with two underlying subsurface areas having $V_1 = 10,000$ ft./sec. and $V_2 = 15,000$ ft./sec., with $P_1$ for the 10,000 ft./sec. event $= 0.050$ (equivalent to 20 c.p.s.) then $$\Delta x = \frac{V_1 \cdot V_2}{(V_2 - V_1)} \Delta t$$

$$= \frac{10 \times 10^3 \cdot 15 \times 10^3}{5 \times 10^3} \cdot \frac{.050}{2}$$

$= 750$ feet spacing between successive shot locations

By utilizing a $\Delta X = 750$ feet between two successive shots, and then shifting and summing the record sets in accordance with the invention, the events traveling along the subsurface layer having $V_2$ will be generally coincident on the records and will thus be obtained. Further, the unwanted events traveling along the layer having velocity $V_1$ will be suppressed by the summing, as these events will be out of phase with one another by 180° after the optimum time shift.

In the case of three successive shot points, the period $p$ may be divided into three parts for effective attenuation, so a $\Delta x$ of $1,500/3 = 500$ feet would be required. Any number of shots may be successively made according to the invention, the shots so separated that a linear array is formed capable of suppressing an unwanted event to any desired degree, while enhancing a desired event in direct proportion to the number of shots in the array. In each of the examples discussed, successive shot locations have been moved away from the detector spread. It will, of course, be evident that similar results may be obtained by moving successive shot locations toward the detector spread, with suitable sign changes being made in the equations.

When the subsurface refractor beds are not generally flat, the relative time-shifting effect on two events of moving the shot location can also be predicted, if the dip of the refractor, or if the angles of the down-going rays at the shot, are known. For instance, FIG. 4 illustrates two successive shot locations 70 and 72 separated by an incremental distance $\Delta x$, wherein the refractor beds slope downwardly in the direction of the detector spread $74a-n$ at a dip angle $\theta$. In FIG. 4, it may be shown that:

$$\sin \alpha_1 = \sin (i_{col} - \theta) = V \cdot \Delta t_1 / \Delta x \qquad (4)$$

wherein $\alpha_1$ is the angle made with the horizontal by the normal of the ray paths 76 and 78.

The time shift for the seismic waves traveling along minimum time ray paths 76 and 78 and through subsurface layers having a velocity $V_0$ refracted along a layer of velocity $V_1$ is:

$$\Delta t_1 = \Delta x \sin (i_{col} - \theta)/V_0 \qquad (5)$$

The time shift for the seismic waves traveling along ray paths 80 and 82 and along the faster path involving subsurface layers having velocities $V_1$ and $V_2$ may be represented as:

$$\Delta t_2 = \Delta x \sin (i_{co2} - \theta)/V_0 \qquad (6)$$

So, $$\Delta t = \Delta t_1 - \Delta t_2 = \Delta x \cdot \frac{\sin(i_{co1} - \theta)}{V_0} - \Delta x \cdot \frac{\sin(i_{co2} - \theta)}{V_0} \qquad (7)$$

wherein $i_{co1}$ and $i_{co2}$ are the "critical" path angles, with reference to the normal, of the slower and faster refractor velocity paths in the overburden layer $V_0$ given by equation (4). Since $i_{co1} - \theta$ and $i_{co2} - \theta$ are the ray "emergence" angles at the shot with reference to the vertical, usually termed $\alpha_1$ or $\alpha_2$, equation (7) may be rewritten as:

$$\Delta t = \frac{\Delta x \sin \alpha_1}{V_0} - \frac{\Delta x \sin \alpha_2}{V_0}$$

$$\Delta t = \frac{\Delta x}{V_0} (\sin \alpha_1 - \sin \alpha_2), \text{ or}$$

$$\Delta x = \frac{V_0 \cdot \Delta t}{\sin \alpha_1 - \sin \alpha_2} \qquad (8)$$

FIG. 5 illustrates a pair of shot locations 84 and 86 spaced apart by an incremental distance $\Delta x$, wherein the subsurface refraction beds are sloped upwardly in the direction of the detector spread $88a-n$ at an angle $\theta$.

Similar geometries exist for this configuration as that described with respect to FIG. 4, except for a sign change for $\theta$. Thus $$\Delta t = \Delta x \left[ \frac{\sin(i_{co1} + \theta) - \sin(i_{co2} + \theta)}{V_0} \right] \qquad (9)$$

The formula for $\Delta x$ in this case remains the same as in equation (8).

It is also possible to introduce a relative time shift according to the invention by generating seismic impulses at different depths. Thus, in FIG. 6, ray paths are directed to two refractor beds $V_1$ and $V_2$ from two shots at locations 90 and 92. The locations 90 and 92 are separated by an incremental depth difference of $\Delta ds$. The difference in the arrival times for each event are:

$$\Delta t_1 = \cos \alpha_1 \cdot \Delta ds / V_0 \qquad (10)$$

and $$\Delta t_2 = \cos \alpha_2 \cdot \Delta ds / V_0 \qquad (11)$$

wherein the normal to the ray paths makes angles with vertical of:

$$\alpha_1 = \sin^{-1} V_0 / V_1, \text{ and } \alpha_2 = \sin^{-1} V_0 / V_2. \qquad (12)$$

The vertical technique of the invention thus changes the sine into the cosine in formulas (4) and (7). This relationship between the horizontal and vertical spacing apart of shot locations is illustrated in FIG. 7, wherein shot $S_{2v}$ is vertically disposed beneath shot $S_1$ by a depth of $\Delta ds$. Shot $S_{2h}$ is horizontally spaced from shot $S_1$ by an interval of $\Delta x$. If the reference wave front passes through $S_{2v}$ or $S_{2h}$, then the additional time $\Delta t$ from $S_1$ and $S_2$ is seen to be either $\Delta ds \cos \alpha / V_0$ or $\Delta x \sin \alpha / V_0$.

In case of dipping beds when utilizing vertically displaced seismic wave generations, apparent emergent velocities are used. The net time shift after placing one event in coincidence would thus be:

$$\Delta t = \Delta t_1 - \Delta t_2 = (\Delta ds / V_0)(\cos \alpha_1 - \cos \alpha_2), \qquad (13)$$

or $$\Delta ds = V_0 \cdot \Delta t / (\cos \alpha_1 - \cos \alpha_2) \qquad (14)$$

Utilizing the illustration of $V_0 = 6,000$ ft./sec., $V_1 = 10,000$ ft./sec. and $V_2 = 15,000$ ft./sec., and $\Delta t = P_1/2 = 0.025$, and substituting these values in equation (14):

$\sin \alpha_1 = 0.6$
$\cos \alpha_1 = 0.8$
$\sin \alpha_2 = 0.4$
$\cos \alpha_2 = 0.9165$ thus, $\Delta ds = 150 \times 1 / 0.1165 \approx 1300$ feet.

A more practical example is a marine seismic exploration system wherein:

$V_0 = 5,000$ ft./sec. (water)
$V_1 = 6,000$ ft./sec.
$V_2 = 20,000$ ft./sec., and
$P/2 = 0.010$ ($f = 50$ c.p.s.), then
$\Delta ds = (0.010 \times 5,000)/(0.530 - 0.968) = -114$ feet.

Thus, in marine shooting, a high-frequency noise wave may be suppressed by a shot depth difference of 114 feet, in accordance with the invention.

Apparatus for filtering the time-shifting seismic records and stacking otherwise combining the seismic records is conventional and well known in the art. For instance, a conventional seismic compositing system is described in U.S. Pat. No. 2,902,107 issued to Erath et al. on Sept. 1, 1959. Shifting of recording heads on a magnetic drum is described in U.S. Pat. No. 2,894,596, issued to Flatow et al. on July 14, 1959. U.S. Pat. No. 2,879,860 issued to Tilley on Mar. 31, 1959 illustrates various apparatus for shifting seismic waves relative to one another and then combining the time-shifted signals.

In some instances, it will be advantageous to perform optimal filtering of the seismic signals before time shifting and stacking or otherwise combining the seismic signals according to the invention. This optimum filtering and stacking, often termed optimum wide band stacking, will enable further enhancement of the selected portions of the refraction signals. Examples of suitable optimum filtering techniques are described in U.S. Pat. application Ser. No. 356,776, filed Apr. 2, 1964 by William A. Schneider; U.S. Pat. application Ser. No. 565,993, filed July 18, 1966 by William A. Schneider and U.S. Pat. No. 3,131,375 issued to Watson on Apr. 28, 1964.

By the application of optimum wide band stacking techniques, a given amount of suppression of unwanted events may be obtained with fewer stacked records (and, therefore, fewer shots required) in a manner similar to stacking of optimum filtered reflection records. However, the optimum wide band refraction stack will in many cases be better than the reflection stack, as the filter design depends on predicted accurate time differences between the events to be preserved or rejected and on a uniform wavelet shape (i.e., uniform frequency content). Both frequency and time delay can often be controlled and predicted more precisely in the case of a refracted event than a reflected event.

In the foregoing description, it will be understood that the refracted seismic traces operated upon according to the invention have been previously corrected for weathering, elevation and other static corrections.

The present invention is thus advantageous in enhancing desired major events of refracted signals, such as refracted signals which assist in mapping thick, relatively high-velocity refracting horizons, such as limestone, as well as events occurring in the so-called "blind zone" of the time distance refraction graph. The present invention is useful to suppress random noise, ground roll, and other low-velocity waves, unwanted reflection data and multiples and reverberations which interfere with and mask useful secondary refraction arrivals in the blind zone of a seismic refraction record.

Whereas the present invention has been described with respect to specific embodiments of the invention, it will be understood that various changes and modifications will be suggested to one skilled in the art, and it is intended to encompass these changes and modifications as fall within the scope of the appended claims.

1. A method for processing seismic refraction data comprising:
   a. generating a first seismic disturbance at a reference location,
   b. receiving a first set of refraction signals at receiver locations spaced a preselected distance from said reference location,
   c. generating a second seismic disturbance at an incremental distance from said reference location which is small compared to said preselected distance, said incremental distance being defined by the following:

$$\Delta x = \frac{V_1 \cdot V_2}{V_2 - V_1} \left(\frac{P}{2}\right)$$

wherein:
   $V_1$ = the velocity characteristic of one of said subsurface areas,
   $V_2$ = the velocity characteristic of the second of said subsurface areas, and
   $P$ = the dominant period of the portion of the signals desired to be suppressed
   d. receiving at said receiver locations a second set of refraction signals which have traveled along generally the same subsurface paths as said first refraction signals, said first and second sets of refraction signals traveling through at least two common subsurface layers having different velocity characteristics,
   e. combining said signals for enhancement and suppression of selected portions of said signals by taking advantage of the time differences of said sets of signals resulting from said incremental distance and the apparent velocities of the selected portions of said signals.

2. The seismic exploration method of claim 1 and further comprising:
   time shifting said first and second sets of refraction signals relative to one another by a time interval dependent upon said incremental distance and apparent velocities.

3. The seismic exploration method of claim 1 and further comprising:
   generating additional seismic disturbances at said incremental distance from said second seismic disturbance,
   receiving at said reference receiver locations additional sets of refraction signals,
   time shifting said additional refraction signals by time intervals dependent upon said incremental distance, and
   combining said time-shifted signals.

4. The method of claim 1 wherein said incremental distance is horizontally disposed.

5. The seismic exploration method of claim 1 wherein said incremental distance is vertically disposed.

6. The seismic exploration method of claim 1 and further comprising:
   filtering said first and second sets of refraction signals prior to combining said signals for additional enhancement of a selected portion of said signals.

7. The seismic exploration method of claim 1 wherein said second seismic disturbance is generated at a horizontal incremental distance from said reference location away from said receiver locations.

8. The seismic exploration method of claim 1 wherein said second seismic disturbance is generated at a horizontal incremental distance from said reference location toward said receiver locations.

9. A seismic exploration system comprising:
   detector means for receiving a first set of refraction seismic signals generated from a first location and for receiving a second set of refraction signals generated from a second location, said first and second locations being spaced apart by a distance such that refraction signals traveling through subsurface layers having different velocity characteristics will be time-delayed by different time intervals, said first and second sets of refraction seismic signals traveling along subsurface paths having at least two different velocity characteristics and it is desired to introduce a specific relative time delay in an unwanted event in each of said seismic refraction recordings such that after processing by time-shifting and combining said signals maximum attenuation of the unwanted event results, the distance between said first and second locations required to produce this time delay being defined by:

$$\Delta x = \frac{V_1 \cdot V_2}{V_2 - V_1} \left(\frac{P}{2}\right)$$

wherein
   $\Delta x$ = distance between said first and second locations,
   $V_1$ = velocity characteristics of one of the subsurface areas,
   $V_2$ = the velocity characteristics of the second subsurface area, and
   $P$ = the dominant period of the unwanted event, and
   means for processing said signals for enhancement of a selected portion of said signals due to the time delays in said signals.

10. The seismic exploration system of claim 9 wherein said distance between said first and second locations is small compared to the distance between said detector means and said first location.

11. The seismic exploration system of claim 9 and further comprising:
   means for time shifting said first and second sets of refraction signals by a time interval approximately equal to the distance between said first and second locations divided by the velocity of said refraction signals through said subsurface layers.

12. The seismic exploration system of claim 9 wherein said sets of signals are summed for enhancement of a selected portion of said signals.

13. A system for processing seismic refraction data comprising:
   a. means located at a reference location for generating a first seismic disturbance,
   b. detector means spaced a preselected distance from said reference location for receiving a first set of refraction signals which travel through subsurface layers of generally consistent velocity characteristics,
   c. means for generating a second seismic disturbance at an incremental distance from said reference location which is small compared to said preselected distance, said detector means receiving a second set of refraction signals which have traveled through generally the same subsurface paths as said first refraction signals, said incremental distance being defined by the following:

$$\Delta x = \frac{V_1 \cdot V_2}{V_2 - V_1} \left(\frac{P}{2}\right)$$

wherein
   $V_1$ = the velocity characteristic of one of said subsurface areas,
   $V_2$ = the velocity characteristic of the second of said subsurface areas, and
   $P$ = the dominant period of the portion of the signals desired to be suppressed,
   d. means for time-shifting said first and second sets of refraction signals relative to one another by a time interval dependent upon said incremental distance and layer velocities, and
   e. means for combining said time-shifted signals to enhance a selected portion of said signals.

14. The system for processing seismic refraction data of claim 13 and further comprising:
   means for generating additional seismic disturbances each spaced said incremental distance from the last seismic disturbance location,
   said detector means receiving additional refraction signals from said additional seismic disturbances.

15. The system for processing seismic refraction data of claim 13 wherein said means for generating said first and second seismic disturbances is spaced apart by a horizontal incremental distance.

16. The system of processing seismic refraction data of claim 13 wherein said means for generating said first and second seismic disturbances are vertically spaced apart by said incremental distance.

17. The system for processing seismic refraction data of claim 13 and further comprising:
   means for optimal filtering of said first and second sets of refraction signals for selective enhancement of portions of said signals prior to combining of said signals.

18. The system for processing seismic refraction data of claim 17 and further comprising:
   means for optimal time domain filtering of said refraction signals.

19. The system for processing seismic refraction data of claim 17 and further comprising:
   means for optimal frequency domain filtering of said refraction signals.

* * * * *